Figure 1:
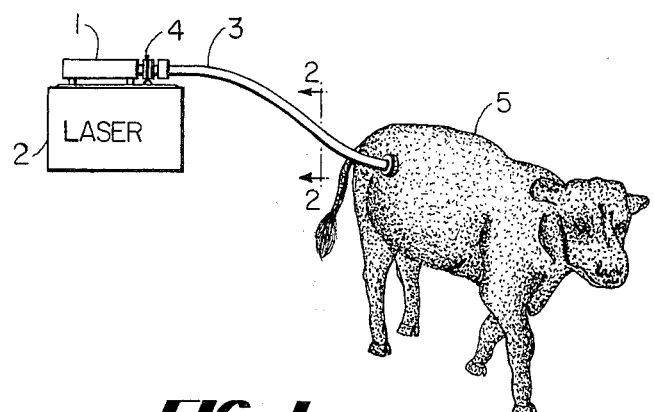
Figure 2:
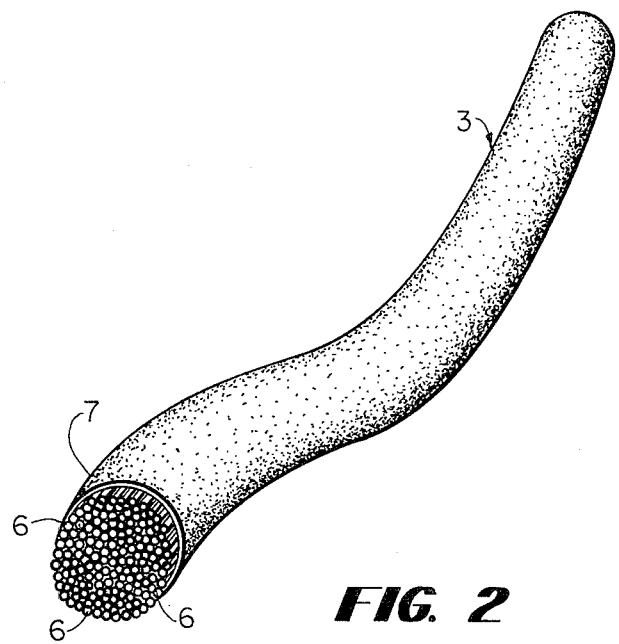

United States Patent [19]
Farrell

[11] 3,916,143
[45] Oct. 28, 1975

[54] BRANDING LIVING ANIMALS

[75] Inventor: Roy Keith Farrell, Pullman, Wash.

[73] Assignee: Research Corporation, New York, N.Y.

[22] Filed: Oct. 28, 1971

[21] Appl. No.: 193,602

Related U.S. Application Data

[63] Continuation-in-part of Ser. No. 136,564, April 22, 1971, which is a continuation of Ser. No. 877,415, Nov. 17, 1969, abandoned.

[52] U.S. Cl. .......................................... 219/121 LM
[51] Int. Cl.² .......................................... B23K 26/00
[58] Field of Search...... 219/121 L; 119/1; 128/395, 128/396, 303, 1

[56] References Cited
UNITED STATES PATENTS

| | | | |
|---|---|---|---|
| 3,266,393 | 8/1966 | Chitayat | 219/121 L |
| 3,315,680 | 4/1967 | Silbertrust | 219/121 L |
| 3,382,343 | 5/1968 | Muncheryan | 219/121 L |

OTHER PUBLICATIONS

"Biological Effects of Laser Radiation", (JAMA) Journal of American Medical Society, pp. 842–847, Vol. 187, No. 11, 3/14/64.

"Lasing Cattle Saves Megabucks", Electro–Technology, 12/69, pp. 28, 29.

"Modulation–Detection Lag", Electronic Design, 3/15/61, pp. 34–37.

"Laser Etching Arrangement", IBM Technical Disclosure Bulletin, Vol. 10, No. 1, 6/67, p. 63.

Primary Examiner—J. V. Truhe
Attorney, Agent, or Firm—Harold L. Stowell

[57] ABSTRACT

Living animals are marked for identification or other purposes by transmitting to surface areas of the skin of the animal through a light-conducting multiple fiber bundle a beam of laser light spatially modulated between the source of the beam and the skin of the animal in selected patterns of an intensity effective to cause irreversible depilation or depigmentation of the hair and/or skin in the target area. The modulation of the laser beam may be effected between the source of the beam and the fiber bundle, between the fiber bundle and the skin of the animal, or in the fiber bundle itself.

1 Claim, 2 Drawing Figures

U.S. Patent  Oct. 28, 1975  3,916,143

INVENTOR.
ROY KEITH FARRELL
BY Stowell & Stowell

BRANDING LIVING ANIMALS

This application is a continuation-in-part of my application Ser. No. 136,564 filed Apr. 22, 1971 as a continuation of my application Ser. No. 877,415 filed Nov. 17, 1969 now abandoned.

This invention relates to a method and apparatus for marking living animals for identification and other purpose.

The invention broadly comprises transmitting to surface areas of the animal to be marked through a light-conducting multiple fiber bundle a beam of laser light spatially modulated between the source of the beam and the skin of the animal in selected patterns of an intensity effective to cause irreversible depilation or depigmentation of the hair and/or skin in the target area. The modulation of the laser beam may be effected by delimiting the beam with a pattern aperture, such as a mask or a stencil, between the source of the beam and the fiber bundle or between the fiber bundle and the skin of the animal, or by suitably ordering the fibers of the fiber bundles to form indicia, patterns, characters and the like. Symbols comprising variously oriented parallel and angular lines as described in application Ser. No. 831,850 filed June 10, 1969 now U.S. Pat. No. 3,633,584 have many advantages, particularly for distinguishably marking the individual animals in a herd or a pack.

The method and the apparatus of the invention may be effectively utilized in the marking of domestic animals, such as cattle and dogs, and wild animals, such as deer and fish.

Laser beams in the spectral range including infrared through ultraviolet may be employed in the invention and, in general, beam intensities of the order of 20 to $75 \times 10^6$ watts per square centimeter at the target area produce irreversible depigmentation without undesirable side effects as described in application Ser. No. 877,415 filed Nov. 17, 1969 now continuation application Ser. No. 136,564 filed Apr. 22, 1971. At somewhat lower intensities hair follicle loss resulting in permanent depilation with a minimum of dermal scarring may be brought about in the target area.

The use of light conducting multiple fiber bundles to transmit the energy of the laser beam to the skin of the animal to be marked makes it possible to position the laser at a substantial distance from the animal without excessive loss of energy due to the high energy conveying efficiency of multiple fiber bundles. Flexible fiber bundles are particularly useful in making it possible to vary the position of the energy delivering end of the bundle over a considerable area without entailing corresponding movement of the laser. As is well known in the art of fiber bundle optics, the fiber dimensions are not critical provided the diameters of the fibers are large compared with the wavelength of the light and provided the fibers in the bundle are spaced at least a wavelength apart to prevent light leakage from one to another.

If the laser beam is modulated prior to or at acceptance of the beam in the receiving face of the fiber bundle the ordered array of the fibers at the receiving face must be maintained through the length of the bundle or restored at the outlet face of the bundle as described, for example, in U.S. Pat. No. 3,255,280 to Burrowes. The modulation of the laser beam may be effected in the receiving or the outlet end of the fiber bundle by suitable arrangement of light transmitting fibers in associated opaque substances to form a desired pattern. Such a construction requires a separate fiber bundle for each different pattern to be used; it would be useful for applying a single brand to a large number of animals but when a number of markings are to be applied it would in general be more convenient to use changeable masks or stencils adjacent the receiving or outlet end faces of the fiber bundle.

The invention will be further described with reference to the accompanying drawing in which:

FIG., 1 is a perspective drawing showing marking apparatus embodying the principles of the invention in use in the branding of a calf; and FIG., 2 is an enlarged perspective view of the fiber bundle of the apparatus in partial section on line 2—2 of FIG., 1.

In the drawings 1 indicates a laser tube mounted on a cabinet 2 containing laser energizing means and directing a laser beam into fiber bundle 3. A mask or stencil 4 carrying the marking to be applied to the animal 5 is removably mounted between the laser outlet and the receiving end of the fiber bundle.

The fiber bundle 3, as shown more clearly in FIG., 2, comprises a plurality of parallel glass fibers 6 held in fixed array by a suitable flexible sealing and spacing medium, as is well known in the art of fiber bundle optics. The fiber bundle is advantageously provided with a flexible protective sheath 7.

I claim:

1. A method of marking living animals with identifying indicia which comprises transmitting to the skin of the animal through a light-conductive multiple fiber bundle a beam of laser light spatially modulated between the source of the beam and the skin of the animal in a selected identifying pattern and of an intensity effective to cause irreversible depilation or depigmentation of the hair or skin of the animal.

\* \* \* \* \*